Sept. 30, 1952  J. DELAMERE  2,612,334
FISHING ROD ANCHOR
Filed Dec. 9, 1947
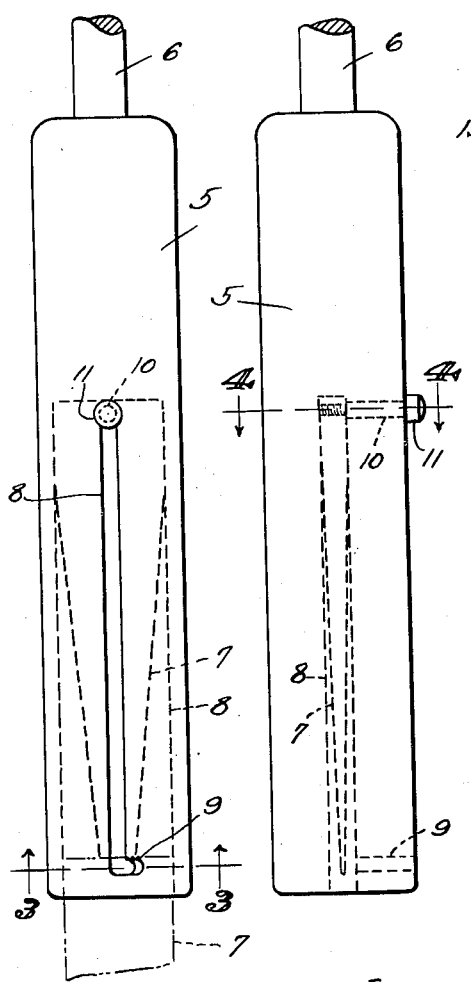
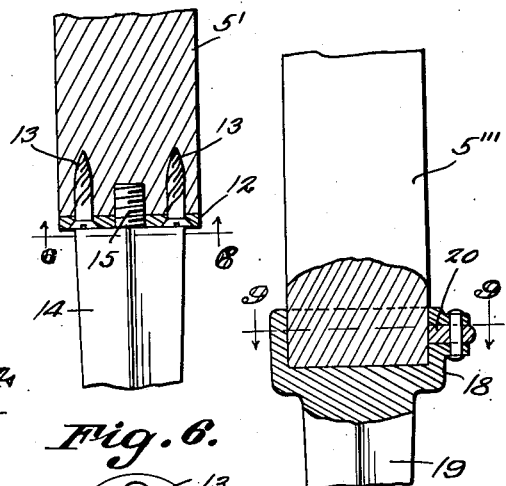
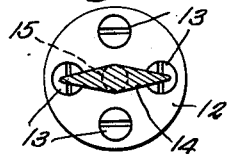
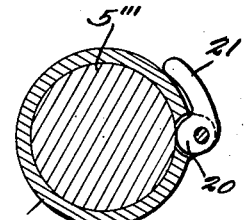
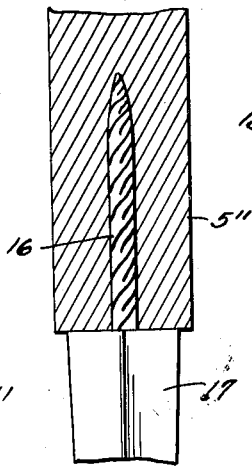
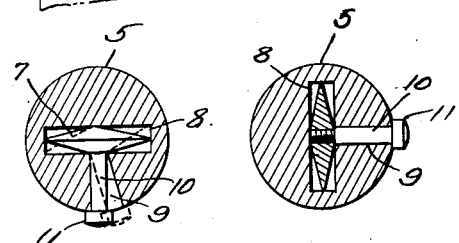
John Delamere
INVENTOR
BY C. A. Snow & Co.
ATTORNEYS.

Patented Sept. 30, 1952

2,612,334

UNITED STATES PATENT OFFICE 2,612,334

FISHING ROD ANCHOR

John Delamere, Denver, Colo.

Application December 9, 1947, Serial No. 790,495

1 Claim. (Cl. 248—38)

This invention relates to an attachment designed for use in connection with fishing rods, the primary object of the invention being to provide an attachment in the form of a blade which may be attached to the handle of the fishing rod so that the fishing rod may be readily and easily forced into the ground surface or other supporting surface for supporting the fishing rod in an upright position, thereby leaving the fisherman's hands free to bait the hook, untangle the line, and release hooked fish.

Another object of the invention is to provide an attachment of this character which may be either constructed as a part of the handle to be readily and easily extended or concealed within the handle, or one which may be permanently secured to the handle, as desired by the fisherman.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing

Figure 1 is an elevational view illustrating the handle of a fishing rod equipped with a blade or prong, constructed in accordance with the invention, the blade or prong being movable into a compartment of the handle where it is concealed, when not in use.

Figure 2 is an elevational view of the handle taken at right angles to Figure 1.

Figure 3 is a sectional view taken on line 3—3 of Figure 1.

Figure 4 is a sectional view taken on line 4—4 of Figure 2.

Figure 5 is a fragmental sectional view taken through one end of the handle equipped with a blade or prong which is permanently secured thereto.

Figure 6 is a sectional view taken on line 6—6 of Figure 5.

Figure 7 is a fragmental sectional view illustrating a fishing rod handle equipped with a blade or prong, wherein the blade or prong is provided with a screw for attaching the blade or prong.

Figure 8 is a fragmental sectional view illustrating a further modified form of the invention where a clamp is used for clamping the blade or prong to the handle.

Figure 9 is a sectional view taken on line 9—9 of Figure 8.

Referring to the drawing in detail, the reference character 5 indicates a fishing rod handle, and the reference character 6 indicates the fishing rod connected to one end of the handle.

As shown, the handle is formed with an opening extending inwardly from the outer end thereof, the opening being elongated longitudinally of the handle, one end thereof having an offset portion 9.

The blade which is indicated by the reference character 7, operates within the opening 8, and is provided with a pin 10 extended therefrom, the pin moving through the opening 8 to extend the blade or retrieve the blade as desired. A head 11 is formed on the pin and affords means to provide for easy operation of the blade.

As may be noted from Fig. 3 the opening receiving the blade is of rectangular cross section while the blade is of diamond shaped cross section. As a result, when the blade is adjusted to the dotted line position illustrated in Fig. 3, the side surfaces of the blade are engaged by the side surfaces of the opening 8 of the handle, at the same time that the pin 10 is properly positioned within the lateral extension 9 of the slot.

In this connection, the end of the blade that has the pin 10 equals, at its point of greatest thickness, the transverse depth of the opening 8, as seen from Fig. 3. As also seen from this figure, said end of the blade in width equals the width of the opening 8. By reason of this arrangement, a construction results wherein the blade has no special base or other attachment ordinarily required for rotatable or rockable mounting of a flattened blade in a sheath such as is here defined by the handle portion. Rather, the relative formation of the knife blade and the opening 8, and the relative dimensions that provide a snug fit of the blade while yet permitting rockable movement thereof, result in a blade mounting wherein a flattened blade has no base or similar attachment, and yet is mounted both for longitudinal adjustment of its support and for transverse rocking movement, while still being given a snug fit tending to prevent wobbling of the blade relative to the handle portion.

When the blade has been extended as shown by dotted lines in Figure 1 of the drawing, the pin is, of course, moved laterally in the offset portion 9, thereby locking the blade against inward movement when the blade is forced into a supporting surface.

In the form of the invention as shown by Figure 5 of the drawing, the end of the handle 5' is provided with a disc 12 which is formed with openings to accommodate the screws 13 that are used in securing the disc to the end of the handle 5'.

The blade or prong indicated by the reference character 14 is provided with a threaded extension 15 that moves through the threaded opening of the disc 12 and passes into an opening formed centrally of the end of the handle 5'. As shown by Figure 7, the handle 5'' is provided with a bore into which the screw 16 of the blade or prong 17 is disposed.

As shown by Figure 8 of the drawing, the handle 5''' is extended into the socket 18 of the blade or prong 19, the socket 18 having an opening formed therein through which the cam 20 moves, the cam 20 being formed on one end of the lever 21 which is pivotally mounted on the socket member. When the cam 20 is moved to the position as shown by Figure 9 of the drawing, the cam will frictionally engage the handle 5''' and secure the prong or blade to the handle.

From the foregoing, it will be seen that due to the construction shown and described, I have provided means whereby a fishing pole may be readily and easily supported by forcing it into the ground surface or into any other suitable supporting structure.

What is claimed is:

A pole anchor comprising an elongated handle, said handle having an elongated axial recess opening through the opposite end thereof, said recess being defined in cross section by relatively wide parallel side walls and relatively narrow parallel end walls, said handle having an elongated longitudinal slot extending therethrough which opens into the recess midway between opposite side edges of a side wall thereof, said slot being provided with a lateral extension adjacent the end of the handle through which the recess opens, an elongated double edge anchoring blade mounted in the recess in the handle for movement longitudinally therein from a projected position in which the major portion of the blade is exposed to a retracted position in which the blade is sheathed, the portion of the blade midway between opposite edges thereof being of a thickness substantially equal to the width of the end walls of the recess, opposite sides of the blade converging as they approach opposite edges thereof to provide oppositely disposed parallel inclined faces, a pin carried by the thick portion of the blade adjacent the end thereof remote from that which is projected beyond the handle, and said pin extending through the slot for moving said blade longitudinally relative to the handle and when moved into the lateral extension of the slot for rocking the blade within the recess and moving oppositely disposed parallel faces of the blades into engagement with opposite side walls of the recess to thereby stabilize the handle relative to the blade.

JOHN DELAMERE.

REFERENCES CITED

The following references are of record in the file of this patent:

UNITED STATES PATENTS

| Number | Name | Date |
| --- | --- | --- |
| 435,446 | Pattee | Sept. 2, 1890 |
| 501,225 | Flake | July 11, 1893 |
| 1,155,589 | McDonald | Oct. 5, 1915 |
| 2,072,791 | Baer | Mar. 2, 1937 |
| 2,209,504 | Beiter | July 30, 1940 |